United States Patent
Leonard et al.

(10) Patent No.: US 7,814,328 B1
(45) Date of Patent: Oct. 12, 2010

(54) DIGITAL SIGNATURES FOR EMBEDDED CODE

(75) Inventors: Arthur C. Leonard, Redmond, WA (US); Bryan J. Reich, Issaquah, WA (US); Daniel M. Cheung, Redmond, WA (US); David M. Vierzba, Redmond, WA (US); Jeffrey M. Cooperstein, Bellevue, WA (US); Mariya Tikunova, Redmond, WA (US); Matthew C. Pohle, Bellevue, WA (US); Patrick J. Smith, Snoqualmie, WA (US); Suraj T. Poozhiyil, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1430 days.

(21) Appl. No.: 11/225,706

(22) Filed: Sep. 12, 2005

(51) Int. Cl.
*G06F 21/00* (2006.01)
*H04L 9/32* (2006.01)

(52) U.S. Cl. ............ 713/179; 713/156; 713/173; 713/175; 708/705; 709/252

(58) Field of Classification Search .......... 713/175–181, 713/187, 156–158; 708/705, 713; 709/252
See application file for complete search history.

(56) References Cited

U.S. PATENT DOCUMENTS

| | | | |
|---|---|---|---|
| 5,748,960 A * | 5/1998 | Fischer ............... | 719/316 |
| 6,006,034 A | 12/1999 | Heath et al. ........... | 717/170 |
| 6,789,156 B1 * | 9/2004 | Waldspurger .......... | 711/6 |
| 6,799,206 B1 * | 9/2004 | Workman et al. ........ | 709/223 |
| 7,028,184 B2 | 4/2006 | Hind et al. ............ | 713/170 |
| 7,203,959 B2 | 4/2007 | Nachenberg et al. ..... | 726/22 |
| 7,290,252 B2 * | 10/2007 | Diedrich et al. ........ | 717/145 |
| 2001/0010720 A1 | 8/2001 | Kimball et al. ........ | 380/241 |
| 2001/0034839 A1 * | 10/2001 | Karjoth et al. ........ | 713/190 |
| 2002/0002703 A1 | 1/2002 | Baentsch et al. ....... | 717/11 |
| 2002/0004902 A1 | 1/2002 | Toh et al. ............ | 713/170 |
| 2002/0087564 A1 * | 7/2002 | Khanna et al. ........ | 707/100 |
| 2002/0087596 A1 * | 7/2002 | Lewontin ............. | 707/513 |
| 2002/0112161 A1 | 8/2002 | Thomas et al. ........ | 713/176 |
| 2002/0170052 A1 | 11/2002 | Radatti .............. | 717/171 |
| 2003/0088790 A1 * | 5/2003 | Kaler et al. .......... | 713/201 |
| 2003/0149581 A1 | 8/2003 | Chaudhri et al. ....... | 705/1 |
| 2005/0050044 A1 * | 3/2005 | Takagi et al. ......... | 707/6 |
| 2005/0055686 A1 | 3/2005 | Buban et al. .......... | 717/170 |
| 2005/0063545 A1 * | 3/2005 | Fujimoto et al. ....... | 380/277 |
| 2005/0086469 A1 * | 4/2005 | Dunagan et al. ....... | 713/163 |
| 2005/0131917 A1 * | 6/2005 | Auerbach ............. | 707/100 |
| 2006/0143600 A1 | 6/2006 | Cottrell et al. ........ | 717/168 |
| 2006/0167902 A1 * | 7/2006 | Bhattacharyay et al. .. | 707/100 |
| 2006/0206718 A1 * | 9/2006 | Frank et al. .......... | 713/182 |

OTHER PUBLICATIONS

Office Action mailed Jul. 8, 2009, in U.S. Appl. No. 11/385,139, pp. 1-20.
Office Action mailed Nov. 23, 2009 in U.S. Appl. No. 11/385,139, pp. 1-17.
Bruce Schneier, John Wiley & Sons,: Applied Cryptography: "Protocols, Algorithms and, Source Code in C", 1996, pp. 30.

* cited by examiner (Continued)

*Primary Examiner*—Benjamin E Lanier
*Assistant Examiner*—Hadi Armouche
(74) *Attorney, Agent, or Firm*—Merchant & Gould P.C.

(57) ABSTRACT

Generating a digital signature of an entire embedded code project is provided while maintaining certain exclusion areas so that a productivity application can incorporate application-specific information into the embedded code project without hampering the digital signature. A tree structure of data may be serialized into a data stream. The tree structure may include multiple branches and one or more elements identified as an exclusion area. A digital signature of the data stream may be created and included in a document associated with the tree structure.

18 Claims, 6 Drawing Sheets

DIGITAL SIGNATURES FOR EMBEDDED CODE

BACKGROUND

Computing systems today are becoming more and more complex. In the past, computing systems may have included productivity applications such as a word processor and a spreadsheet program, whose functions were simply to create text documents and compute numbers. Today those same productivity applications include complex features, such as embedded programming environments. In other words, productivity applications today may include the ability to embed executable code within the documents themselves. This embedded code enables the features of the productivity application to be programmatically manipulated.

Many sophisticated users employ software developers to write or develop custom software programs (e.g., 'macros') within these embedded programming environments. For example, a company may employ developers to write customized software that executes in conjunction with a productivity application, such as a word processor, that is used enterprise-wide. The customized software may include functionality to assist the users with their ordinary tasks or to automate some of those tasks.

Such customized software creates an opportunity for malicious code or viruses to be introduced into a user's document. For example an outsider could receive an e-mail with a document having embedded code that is malicious. For these reasons, safe-software practices need to be applied to this embedded code. For example, code-signing is a common method of ensuring that a software program has not been modified since it was signed. Many companies take advantage of code signing for any customized software that they develop. Commonly, productivity software that allows customized embedded code to be developed includes the ability to sign their embedded code.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, implementations are provided for generating a digital signature for an embedded code project, while maintaining certain areas that are excluded from the digital signature. Briefly stated, data from a document is serialized in preparation for signing. The serialized data is signed, and the signature is embedded in the document. Certain information in the data may be explicitly excluded from the signature. Modifications to that certain information will not invalidate the signature.

DETAILED DESCRIPTION

Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

What follows is a detailed description of various embodiments. Briefly stated, in one embodiment a productivity application includes an embedded programming environment and a security manager. The security manager is responsible for signing and verifying the signatures of embedded code within documents used by the application. The security manager is configured to create a digital signature for the entire embedded code, while maintaining certain areas of exclusion for internal use by the application.

Figure 1:
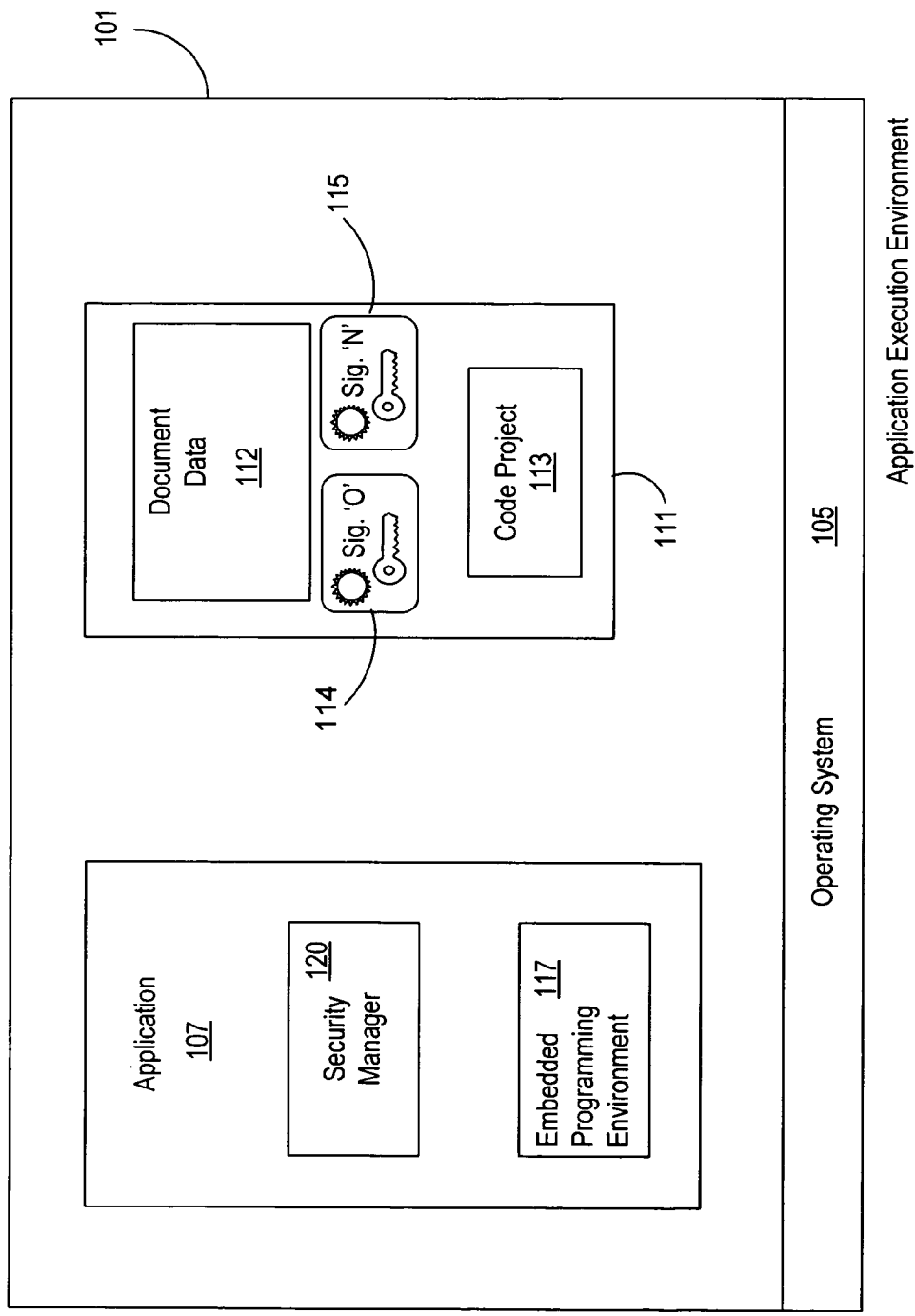
FIG. 1 is a functional block diagram of an application execution, according to one embodiment.

FIG. 1 is a functional block diagram of an application execution environment 101, according to one embodiment. The application execution environment 101 may be implemented in any conventional computing system. The application execution environment 101 may be a system memory in which software programs reside and/or execute. An operating system 105 resides and executes in the application execution environment 101 to control the hardware of the host computing device and any other software programs executing in the application execution environment 101.

In this implementation, a productivity software program (application 107) resides and executes in the application execution environment 101. The application 107 may be any application that loads or saves files, such as a word processing program, a spreadsheet program, database program, presentation creation program, drawing program, or the like. In some scenarios, one application can load a file (e.g., a viewer) and another can save the file. The application 107 is used to create, modify, and otherwise maintain documents, such as document 111.

The application 107, in this embodiment, includes an embedded programming environment 117 and a security manager 120. The embedded programming environment 117 is a tool used to create, maintain, compile, and execute customized code (and scriptable code in some embodiments) that may be stored (embedded) within the application's documents. The embedded programming environment 117 may be used to create embedded code, such as macros, to automate features or functionality of the application 107. In other embodiments, the code may be stored in a file outside of the document and, for example, referenced by the document.

Figure 2:
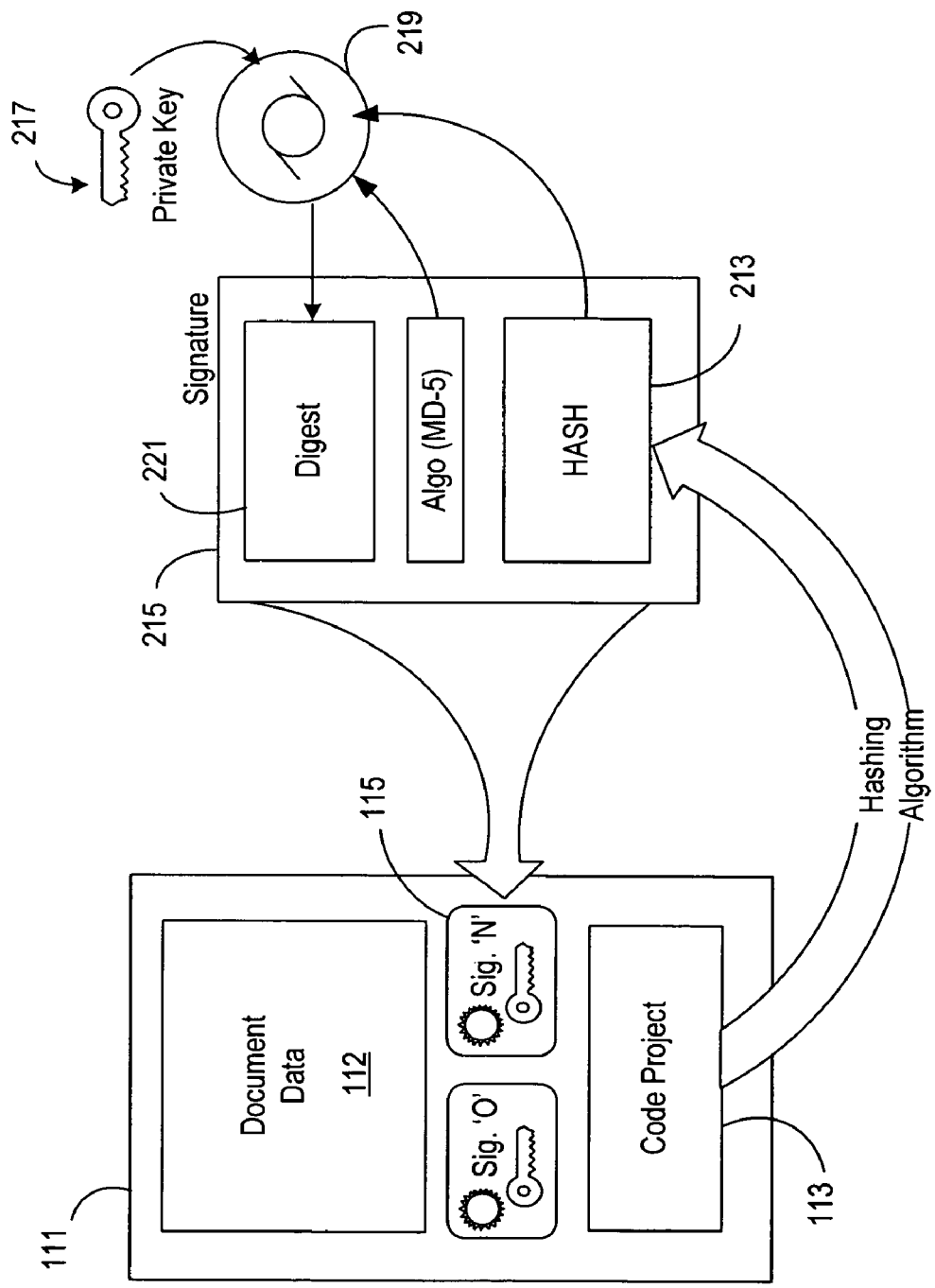
FIG. 2 is a functional block diagram generally illustrating a document, including signed embedded code, according to one embodiment.

The security manager 120 is another component of the application 107 and is used to ensure that code executed by the embedded programming environment 117 is secure. The security manager 120 may be configured to digitally sign and to verify digital signatures of embedded code. One particular technique that may be employed by the security manager 120 to sign embedded code is illustrated in FIG. 2 and described below.

The application 107 may exist in several different versions of which one or more may be installed at any one time on any one computing device. Accordingly, the security manager 120 and the embedded programming environment 117 of this version of the application 107 may operate differently in some respects than their counterparts in earlier versions. In some embodiments, the same programming environment component can be used to address multiple versions of the application with a singe library. The decision on which "mode" to run in is made by the application, which in the case of legacy or prior versions, could be a passive decision to run in the old mode. Certain techniques may be used to maintain backwards compatibility, as developed more fully below.

The document 111 may be any form of computer-readable data that is used by the application 107. In accordance with this implementation, the document 111 includes document data 112, which may be any form of data that is used or manipulated by the application 107 under control of the user. For example, if the application 107 is a word processing program, the document data 112 may comprise text, equations, tables, or other word processing information.

Figure 3:
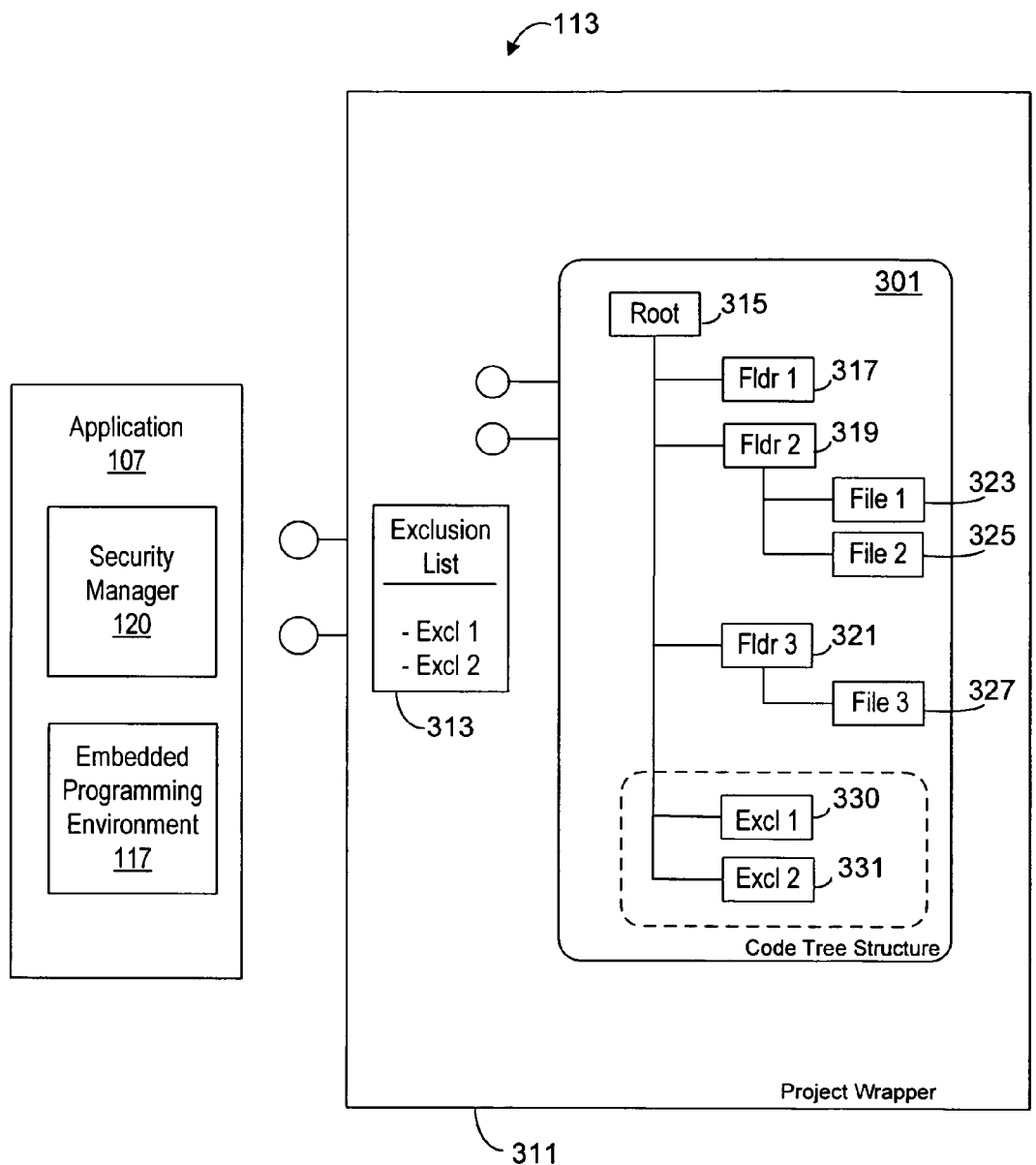
FIG. 3 is a functional block diagram illustrating in slightly greater detail an embedded code project that may be signed, according to one embodiment.

In this scenario the document 111 also includes a code project 113, which is embedded executable code to automate or otherwise programmatically access functionality of the application 107 (note, in some scenarios the file can be saved and loaded without a code project). In some embodiments, a code project may include or consist of non-programmatic items such as a database query string. The code project 113 is created and maintained by the embedded programming environment 117. The code project 113 may include several different components, such as source code, compiled code modules (including graphical items such as forms that can display a user interface to a user), meta information defining the code project 113, and the like. One specific implementation of the code project 113, configured in accordance with this embodiment, is illustrated in FIG. 3 and described below.

In some embodiments, the document data 112 is not signed (i.e., the code project is signed but not the data). For example, it is frequently desirable for other users besides just the signer to be able to modify the document data 112 without breaking the digital signature for the code project 113. In such an embodiment, the application 107 allows edits to be made to the document data 112 without modifying the code project 113. If the modifications to the document data 112 cause a change(s) to the code project 113, in some embodiments, the change(s) an exclusion area may be defined to contain the code project change(s), as long as such changes to the code project 113 are believed to not change its execution behavior.

In this exemplary embodiment, the document 111 also may include two digital signatures associated with the code project 113, an old signature (sig O 114) and a new signature (sig N 115). In other embodiments, a document may have only one signature or more than two signatures. The validity or authenticity of the code project 113 may be verified by examining one or both of the digital signatures associated with the code project 113. In some embodiments, the old signature is verified only if a compatibility flag is set. In this particular example, the old signature 114 is associated with an older version of the application 107, and was created using a now-outdated signature creation technique. In contrast, in this example embodiment, the new signature 115 was created using the latest version of the application 107 using the most current signature creation technique.

For example, in one scenario, a document is signed with a newer version of the application (that includes the new signature creation technique) and then the document is received by a user using an older version of the application (that includes an old signature creation technique). Then, if that user modifies and signs the project (with the older version), the document will be in a state where both signatures are present. In this example, each of the two digital signatures is stored in a different location within the document 111. In other words, a "file format" may be used to represent the document as a tree structure with the various components of the document 111 residing within different leaves, nodes, branches, or other elements of the document file format. To preserve the two digital signatures, each one may be stored within a different element of the document file format. Although the two signatures may be present, in some embodiments resigning the document using the older version of the application will break the newer signature.

In this way, older versions of the application 107 that are configured to search for the digital signature (sig O 114) within a particular location of the document 111 will still find that signature. In contrast, the current version of the application 107 would be configured to search for the new digital signature (sig N 115) in a different location. In this way, if the code project 113 is signed using the latest security manager 120, which employs a different signing mechanism (e.g., a more secure hash function), an older version of the application 107 would not confuse the new digital 115 signature with an invalid signature.

In one embodiment, if the document (with two signatures) is then signed using the newer version of the application, the newer version signs the project with the old signature creation technique and store the signature at the old signature location. However, in an alternative embodiment, the new version of the application removes the old signature.

FIG. 2 is a functional block diagram generally illustrating a document 111 including embedded code signed in accordance with one embodiment. As shown in FIG. 2, the document 111 includes document data 112 and an embedded code project 113 as described earlier. In some embodiments, a user or developer may create or modify the code project 113 in conjunction with or separate from creating or modifying the document 111. As mentioned above, in some embodiments the embedded programming environment 117 (FIG. 1) is used to create, edit, maintain, and execute the code project 113. In other embodiments, the document 111 may be constructed without using the application, and thus the embedded programming environment. For example, a user may create the project in one file, strip it from that file and embed it in the document 111.

To assist with security, the user may choose to digitally sign the code project 113 so that others who use or access the document 111 will have some confidence that the code project 113 has not been altered after it was last saved by the signing party. In accordance with this implementation, the entire code project 113 is digitally signed except that certain exclusion areas, which are believed to be safe, are not signed. This technique differs from previous or conventional embedded code signing technologies that digitally sign only selected portions of the code project. The inventors have determined, after extensive testing and experimentation, that an acceptable level of security cannot be achieved by attempting to select which portions of the code project 113 to sign while leaving the remainder unsigned. Accordingly, the inventors have determined that a superior technique is to sign the entire code project, and explicitly identify any areas to leave unsigned. One such technique is illustrated in FIG. 3 and described below.

In this particular example, the digital signature 215 is created by first generating a hash of the code project 113. It should be appreciated that although generally described as hashing the entire code project 113, this implementation hashes the entire code project 113 less any exclusion area (described in conjunction with FIG. 3). However, for simplicity of discussion, this example will describe hashing the entire code project 113 as if this particular code project 113 includes no exclusion area.

Hashing the code project 113 creates a code project hash 213. The code project hash 213 becomes the basis for the digital signature 215. Accordingly, the code project hash 213 in combination with a cryptographic key 217 are input to a particular hashing algorithm 219, such as, for example the SHA-1 hashing algorithm known in the art. Other suitable hashing algorithms can be used in other embodiments. The output of the hashing algorithm 219 is a digest 221, which is basically an encrypted hash of the code project hash 213. The digest 221 is the information used to later verify the validity of the code project 113. The particular hashing algorithm 219 used to create the digest 221 may also be identified within the signature 215. When complete, the entire digital signature 215 is stored within the document 111 as an embedded digital signature 115.

FIG. 3 is a functional block diagram illustrating in slightly greater detail an embedded code project 113 that may be signed in accordance with one embodiment. As shown in FIG. 3, the code project 113 includes several components. Fundamentally, the code project 113 includes a code tree structure 301 that includes computer-executable components and modules, in one or more of many different forms, as well as meta data. The code tree structure 301 may include source code that defines the executable components in human-readable form, as well as object code that embodies the executable components in computer-executable form. In addition, there may be descriptive components of the code tree structure 301 that define the form and layout of the code project 113. The descriptive components may be used by the embedded programming environment 117 when editing or modifying the code project 113.

As shown, the code tree structure 301 is embodied, in this example, in a component object model that has a root 315 and several nodes under that root 315. In this particular example, there are three folders immediately under the root 315. In addition, there are two other components (excl1 330, excl2 331), which may be folders or files or other resources, also under the root 315. Fldr2 319 includes two files, file1 323 and file2 325. Fldr3 321 includes one file, file3 327. The terms files and folders are used in a general sense in this context. For example, files and folders can respectively correspond to Streams and Storages in embodiments using an OLE (Object Linking and Embedding) structured storage format. This is but one simplified example to illustrate the point, and many much more complex code tree structures are anticipated in practice.

In accordance with this implementation, two of the nodes of the code tree structure 301 have been specifically identified as "exclusion areas," namely excl1 330 and excl2 331. Exclusion areas are one or more particular locations (e.g., elements of the tree structure) that are identified for exclusion from the code project 113 when being hashed for a digital signature. The exclusion areas enable the application 107 to store its own information within the code tree structure 301 that it may manipulate or which may be manipulated by the user or another application without invalidating the digital signature. Generally stated, the exclusion areas are particular portions of the code project 113 that are explicitly identified for exclusion from the data upon which the digital signature is based.

In order to support the exclusion areas, a storage wrapper 311 is created to "wrap" the code tree structure 301. The storage wrapper 311 is, essentially, an object class whose function is to enclose the code tree structure 301 and provide access to the components (elements) of the code tree structure 301. The storage wrapper 311 includes an exclusion list 313, which may be a property or other data element included within the storage wrapper 311. Any access to the code tree structure 301 uses the interfaces exposed by the storage wrapper 311.

Figure 4:
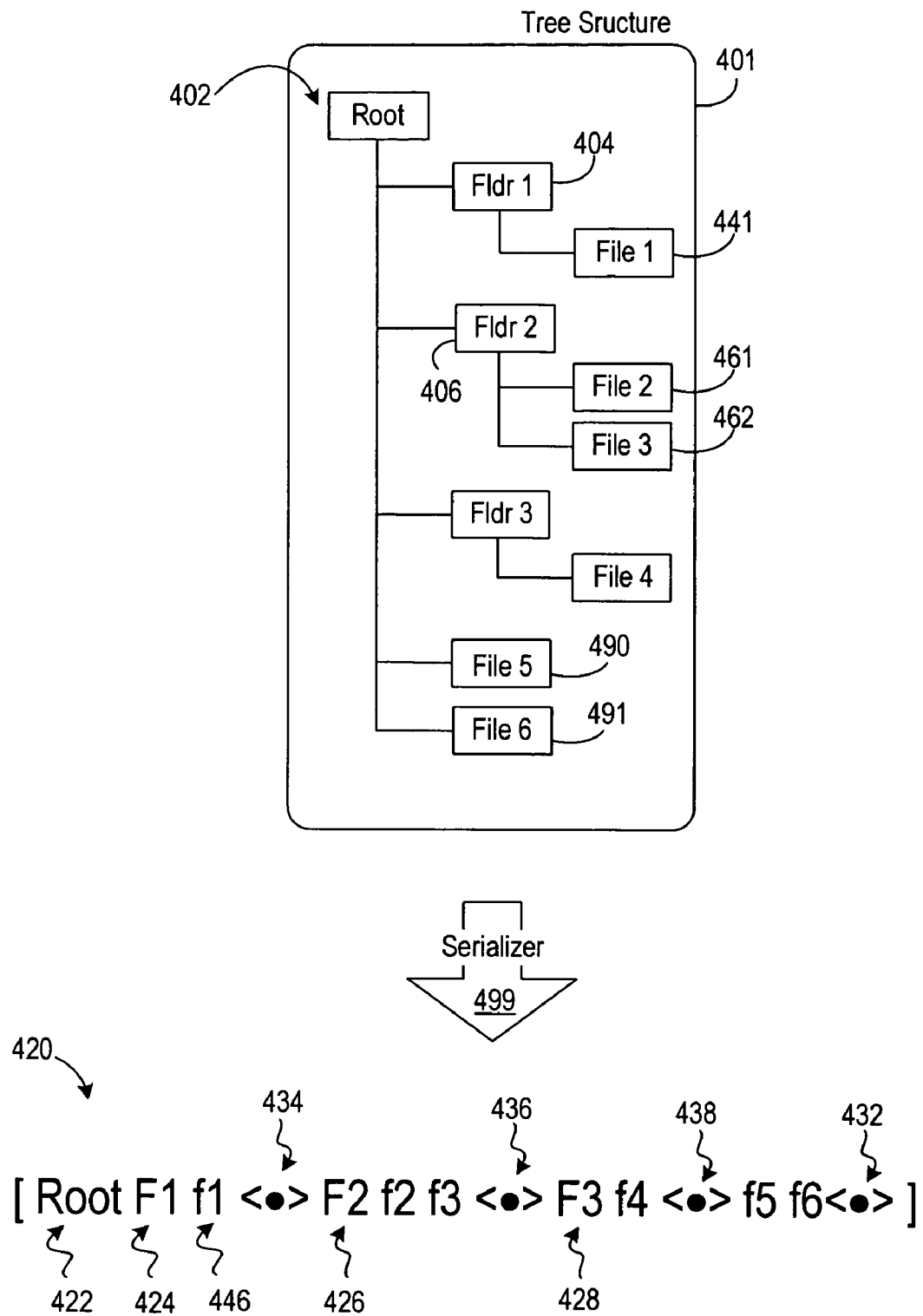
FIG. 4 is a conceptual illustration of one mechanism for reversibly serializing data from a tree structure to a flat structure, according to one embodiment.

The security manager 120, when requested, creates a digital signature of the code project 113. To do so, the security manager 120 first serializes the data within the code tree structure 301 into a flat data stream that may be hashed using a hashing algorithm. One particular technique for serializing the data is illustrated in FIG. 4 and described below.

The security manager 120 basically enumerates each of the components within the code tree structure 301 to extract the data. However, because it is accessing the interfaces of the storage wrapper 311 rather than the code tree structure 301 directly, the storage wrapper 311 is configured to respond to these enumeration requests in the following manner:

The security manager 120 iteratively requests the data for each component in the code tree structure 301 from the storage wrapper 311. As the storage wrapper 311 responds to each such request, it first determines whether the requested component in the code tree structure 301 is named within the exclusion list 313. For example, in response to the first request for components within the code tree structure 301 the storage wrapper 311 retrieves the data for the root 315. Before returning the data to the security manager 120, the storage wrapper 311 determines whether the name of the root node 315 resides on the exclusion list 313. Not being on the list, the storage wrapper 311 returns the data for the root 315, and the security manager 120 requests the next component.

This process continues until, eventually, the code tree structure 301 returns the first exclusion area (excl1 330). However, finding the name of the first exclusion area (excl1) on the exclusion list 313, the storage wrapper 311 does not return that data, but instead goes to the next element in the code tree structure 301. Similarly, when the code tree structure 301 returns the second exclusionary area (excl2 331), the storage wrapper 311 does not return that data.

In one embodiment, the exclusion list 313 is a hard coded list, defined by the application that needs it. When the storage wrapper 311 is created, the exclusion list 313 is handed off to the storage wrapper 311 before the exclusion list is asked to enumerate.

When finished, the security manager 120 will have extracted all of the elements of the code tree structure 301 except those identified on the exclusion list 313. The digital signature is created using the extracted (serialized) data and is, thus, not affected by a change to any data in an exclusion area.

In this manner, the application 107 may maintain certain portions of the code tree structure 301, which the application may change without impacting the digital signature of the code project 113. Examples of types of information that may be stored in those locations include document information (e.g., creation dates, modification dates, and the like) and perhaps even the digital signature of the code project 113 itself. That is, rather than identifying which portions of the code tree structure 301 to sign while excluding the rest, in this embodiment, the security manager 120 signs the entire code tree structure 301 while only excluding certain explicit locations that are believed to be safe. In this way, much stricter control can be had over any content that is not signed.

FIG. 4 is a conceptual illustration of one mechanism for reversibly serializing data from a tree structure to a flat structure. The mechanism illustrated in FIG. 4 is but one of very many mechanisms that may be used to serialize data in preparation for hashing the data. However, the inventors have determined through experimentation and testing that the mechanism illustrated in FIG. 4 and described here may present certain performance advantages over other mechanisms in some circumstances.

As illustrated, the tree structure 401 includes a conventional directory or folder structure that has several layers. Data, such as source code, object code, configuration or meta information, or any other data may be stored in any one or more elements of the tree. A root node 402 has children which may be either folders or files (e.g., Streams and Storages in embodiments using an OLE structured storage format). Each folder of the tree structure 401 may itself have children, which may be either folders or files. The tree structure 401 is very efficient for accessing, managing, and manipulating data by a file system or an application. However, in order to hash the data within the tree structure 401, the data needs to be serialized so that it may be manipulated as a data stream. Accordingly, a serializing component (serializer 499) is used to convert the data within the tree structure 401 to a serialized data stream 420. The serializer 499 could be a component of the security manager 120 (FIG. 1).

Serializing data, generally, is known in the art. However, one obstacle that must be addressed is how to identify the different layers of the tree structure within a serial data stream. Different methods can be used to indicate that data is contained within one or another branch of the tree structure 401. However, in this particular implementation, a marker or "cookie" is written at the end of the children of each branch (e.g., folder). The cookie may take one of very many forms, but essentially is a series of bits to indicate that the end of a branch has been reached. The cookie should be a set of bits that differs from any sets of bits used to indicate the beginning of an actual data file or folder. In this way, the cookie is not confused with valid data of the tree structure 401.

By way of example, the serializer 499 retrieves the data from each element of the tree structure 401 and writes it to the serialized data stream 420 beginning with the data of the root node 402. As shown in the serialized data stream 420, the root data 422 begins the stream. The serializer 449 next retrieves the data from Fldr1 node 404 and its child, file 441. That data is written to the serialized data stream 420 as Fldr1 data 424 and file1 data 446. In accordance with this implementation, a cookie 434 is then written to the serialized data stream 420 to indicate that the end of the Fldr1 branch has been reached. Note that no similar cookie has been written yet for the root data 422 because the end of the root data 422 has not yet been reached.

The serializer 499 next retrieves the data for the Fldr2 node 406 and its children, file2 461 and file3 462. The serializer 499 writes the data for those to the data stream 420 immediately after the Fldr1 cookie 434. Once it has written the last of the children for the Fldr2 data 426, the serializer 499 writes another cookie 436 to indicate the end of the Fldr2 data 426. Likewise, the Fldr3 data 428 and its children are written to the serialized data stream 420, followed by yet another cookie 438. At this point in the tree structure 401, only two children (i.e., file5 490 and file6 491) of the root 402 remain. Accordingly, the data for those two files are written to the serialized data stream 420, and terminated by the final cookie 432.

Note that each cookie in the serialized data stream 420 essentially terminates one folder branch of the tree structure 401. In one sense, the cookie is analogous to a "closing tag" used in many markup languages, such as eXtensible Markup Language (XML), to enclose an element. In that sense, the particular folder to which the cookie corresponds would be analogous to an "opening tag" in those markup languages.

The technique illustrated in FIG. 4 and described above is but one of many serialization techniques. It is envisioned that a proper functioning of various embodiments may be achieved with this or any other serialization technique. For example, one could simply walk each branch in the tree structure 401 and count the number of children in each branch. That numeric information could then be written to a serialized data stream rather than a cookie. Other alternatives will also be available.

What follows are descriptions of generalized processes that implement various embodiments. These processes may be implemented using computer-executable instructions, but may also be implemented in other ways, such as with programmable logic, electronic circuitry, or the like. Moreover, these processes are not to be interpreted as exclusive of embodiments, but rather are provided as illustrative only.

Figure 5:
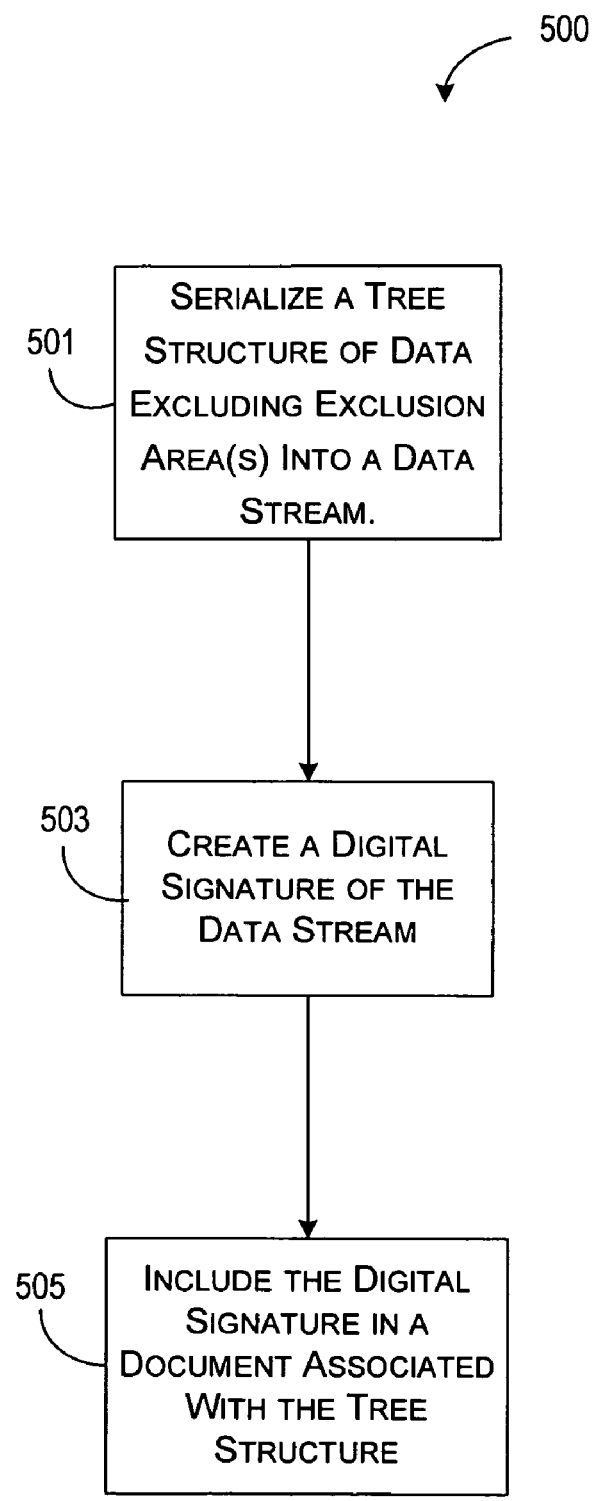
FIG. 5 is a flow diagram generally illustrating the operational flow for signing embedded code that includes exclusion areas, according to one embodiment.

FIG. 5 illustrates an operational flow 500 for digitally signing embedded code that includes exclusion areas. In one example, the operational flow 500 may be implemented by a security manager component that is responsible for signing embedded code.

Operational flow 500 begins at a block 501, where a tree structure of data is serialized into a data stream. The tree structure includes a plurality of branches with at least one element of the tree structure identified as an exclusion area. The exclusion area(s) are excluded from the data stream. For example, the security manager may enumerate each element of the tree structure and write the data for each element to the data stream while omitting any element identified on an exclusion list. In other embodiments, the data stream may include data that is not part of or in addition to the data of the serialized tree.

At a block 503, a digital signature of the data stream created. In one example, the security manager creates the digital signature by hashing the data stream in combination with a cryptographic key. Any hash function may be used, such as the SHA-1 hashing algorithm known in the art.

At a block 505, the digital signature is included in a document associated with the tree structure. In one embodiment, the digital signature is embedded within the same document as the tree structure.

Although operational flow 500 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Figure 6:
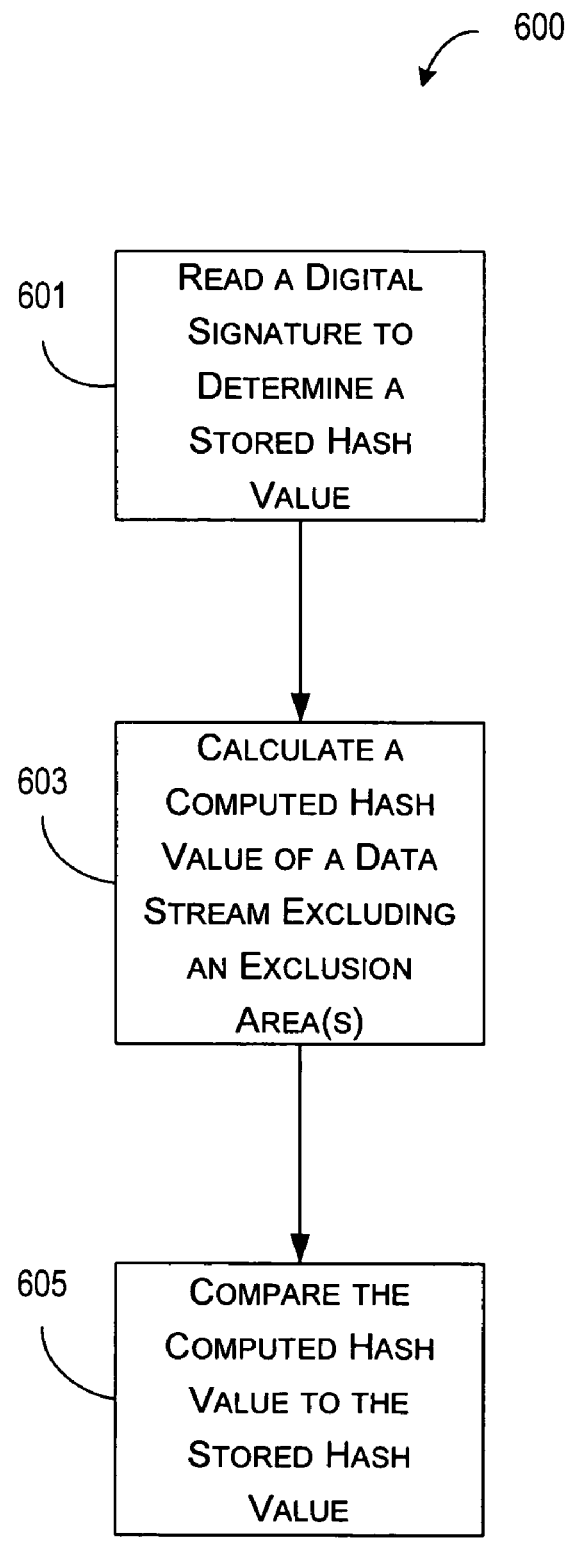
FIG. 6 is a flow diagram generally illustrating the operational flow for verifying the signature of embedded code that includes exclusion areas, according to one embodiment.

FIG. 6 illustrates an exemplary operational flow 600 for verifying the signature of embedded code that includes exclusion areas. In one example, operational flow 600 may be implemented by a security manager component that is responsible for verifying digital signatures.

Operational flow 600 begins at a block 601, where a digital signature is read to determine the stored hash value. The stored hash value is associated with a data stream.

At a block 603, a computed hash value is calculated based on a data stream. The data stream represents a tree structure of data in a serialized form. In this example, the tree structure upon which the data stream is based includes at least one element identified as an exclusion area. The calculation of the computed hash value excludes that exclusion area.

At a block 605, the computed hash value is compared to the stored hash value. If the comparison reveals that the two hash values are dissimilar, then a warning may be issued that the data stream has been altered. If the data stream represents executable code embedded within a document, the warning may indicate that the executable code may not be safe for execution.

Although operational flow 600 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A method for signing data, comprising:
serializing a tree structure of data into a data stream, the tree structure including a plurality of branches, the tree structure further including at least one element identified as an exclusion area, the data stream excluding the exclusion area, wherein serializing the tree structure into a data stream comprises converting the tree structure of data into a horizontal series comprising a root node, the root node comprising a plurality of folders, the plurality of folders comprising a plurality of data files, wherein the series further comprises a marker written at the end of at least one of the plurality of data files, the marker indicating the beginning of at least one of a folder and a data file;
creating a digital signature of the data stream; and
including the digital signature in a document associated with the tree structure, wherein the digital signature is included in the document at a location that differs from another location in which is stored an old digital signature, wherein the old digital signature is associated with an older generation of digital signature creation functionality, wherein the digital signature is stored within a first element of a document file format and wherein the old digital signature is stored within a different element of the document file format to preserve the both the digital signature and the older digital signature in the document, wherein an older version of an application searches for the old digital signature in the different element of the document file format.

2. The method of claim 1, wherein the marker comprises a series of bits that differs from ordinary data within the tree structure.

3. The method of claim 1, wherein the tree structure includes a portion having computer-executable instructions in human-readable form.

4. The method of claim 3, wherein the tree structure further includes computer-executable instructions in object code form.

5. The method of claim 4, wherein the tree structure further includes meta information that describes the computer-executable instructions.

6. The method of claim 1, wherein the tree structure includes computer-executable instructions embedded within the document and operative to automate functionality of an application with which the document is associated.

7. A method for verifying a digital signature, comprising:
reading a digital signature to determine a first hash value, wherein the digital signature is included in the document at a location that differs from another location in which is stored an old digital signature, wherein the old digital signature is associated with an older generation of digital signature creation functionality, wherein the digital signature is stored within a first element of a document file format and wherein the old digital signature is stored within a different element of the document file format to preserve the both the digital signature and the older digital signature in the document, wherein an older version of an application searches for the old digital signature in the different element of the document file format;
calculating a second hash value of a data stream, the data stream representing a tree structure of data in a serialized form, the tree structure having at least one element identified as an exclusion area, the calculation of the second hash value excluding the exclusion area, wherein the serialized form comprises a horizontal series, the horizontal series comprising a root node, the root node comprising a plurality of folders, the plurality of folders comprising a plurality of data files, wherein the series further comprises a marker written at the end of at least one of the plurality of data files, the marker indicating the beginning of at least one of a folder and a data file;
and comparing the second hash value to the first hash value.

8. The method of claim 7, wherein the digital signature is embedded within a document, and further wherein the tree structure represents a code project that includes computer-executable instructions operative to automate functionality of an application with which the document is associated.

9. The method of claim 8, wherein the code project includes a portion having computer-executable instructions in human-readable form.

10. The method of claim 9, wherein the code project further includes computer-executable instructions in object code form.

11. The method of claim 10, wherein the code project further includes meta information that describes the computer-executable instructions.

12. The method of claim 7, wherein the marker comprises a series of bits that differs from ordinary data within the data stream.

13. A non-transitory computer-readable storage medium containing computer-executable instructions which, when executed by a computer, will cause the computer to perform a method for signing data, the method comprising:

serializing a tree structure of data into a data stream, the tree structure including a plurality of branches, the tree structure further including at least one element identified as an exclusion area, the data stream excluding the exclusion area, wherein serializing the tree structure into a data stream comprises converting the tree structure of data into a horizontal series comprising a root node, the root node comprising a plurality of folders, the plurality of folders comprising a plurality of data files, wherein the series further comprises a marker written at the end of at least one of the plurality of data files, the marker indicating the beginning of at least one of a folder and a data file;

creating a digital signature of the data stream; and including the digital signature in a document associated with the tree structure, wherein the digital signature is included in the document at a location that differs from another location in which is stored an old digital signature, wherein the old digital signature is associated with an older generation of digital signature creation functionality, wherein the digital signature is stored within a first element of a document file format and wherein the old digital signature is stored within a different element of the document file format to preserve the both the digital signature and the older digital signature in the document, wherein an older version of an application searches for the old digital signature in the different element of the document file format.

14. The non-transitory computer-readable storage medium of claim 13, wherein the marker comprises a series of bits that differs from ordinary data within the tree structure.

15. The non-transitory computer-readable storage medium of claim 13, wherein the tree structure includes a portion having computer-executable instructions in human-readable form.

16. The non-transitory computer-readable storage medium of claim 15, wherein the tree structure further includes computer-executable instructions in object code form.

17. The non-transitory computer-readable storage medium of claim 16, wherein the tree structure further includes meta information that describes the computer-executable instructions.

18. The non-transitory computer-readable storage medium of claim 13, wherein the tree structure includes computer-executable instructions embedded within the document and operative to automate functionality of an application with which the document is associated.

\* \* \* \* \*